July 31, 1923.

A. LAURITZEN ET AL

SAFETY DEVICE AGAINST THE THEFT OF MOTOR CARS

Filed March 25, 1922    2 Sheets-Sheet 1

1,463,218

Inventors
Alfred Lauritzen and
Victor Lauritzen.
per. Severs
Attorney.

Inventors
Alfred Lauritzen and
Victor Lauritzen.

Patented July 31, 1923.

1,463,218

UNITED STATES PATENT OFFICE.

ALFRED LAURITZEN AND VICTOR LAURITZEN, OF LAEKEN-BRUSSELS, BELGIUM.

SAFETY DEVICE AGAINST THE THEFT OF MOTOR CARS.

Application filed March 25, 1922. Serial No. 546,808.

*To all whom it may concern:*

Be it known that we, ALFRED LAURITZEN and VICTOR LAURITZEN, both citizens of Brazil, and residing 117 Rue Leopold I, Laeken-Brussels, in Belgium, have invented a new and useful Safety Device Against the Theft of Motor Cars, of which the following is a specification.

The present invention relates to a safety device against the theft of motor cars, comprising essentially a metal casing fixed on the dashboard of the car and provided with a lid or door which is normally kept closed by means of a secret lock which can only be unlocked by the authorized driver who is acquainted with the combination number, the said casing enclosing the switch of the sparking-circuit and a device for operating at a distance a sliding-bolt which normally keeps the bonnet of the car locked from the inside.

Figure 1:
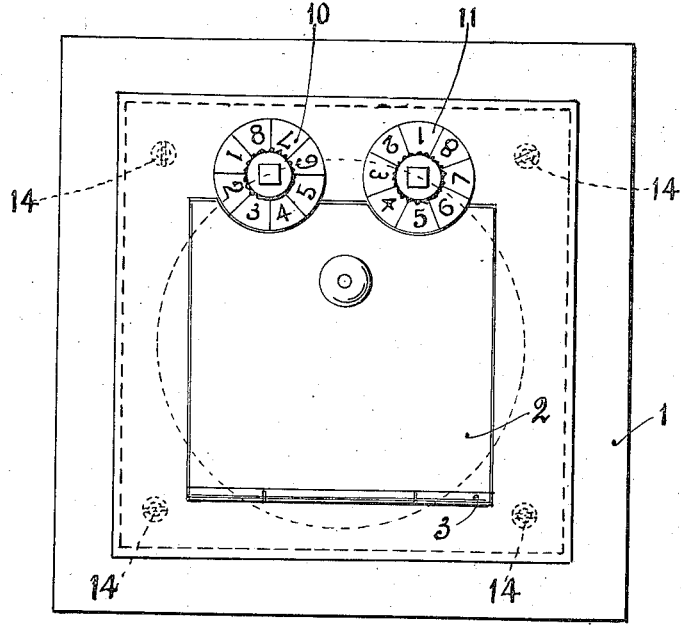
Figure 2:
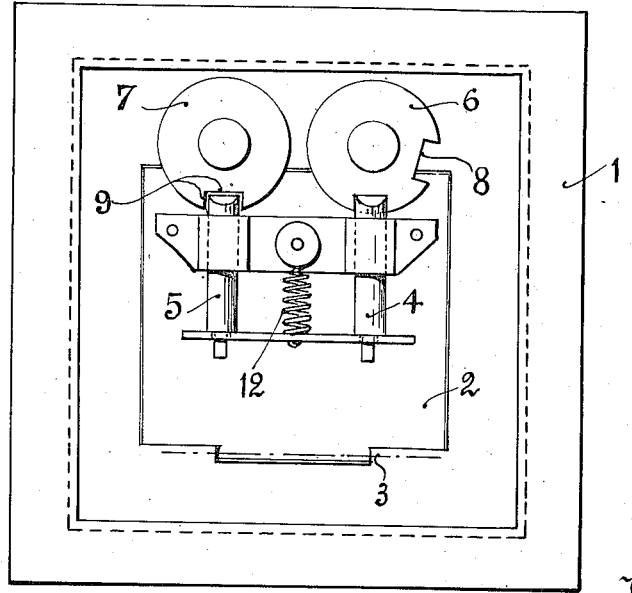

In order that the invention may be readily understood certain embodiments thereof are, by way of example only, illustrated by the accompanying drawings, to which reference will be made in the following description, and wherein:

Fig. 1 is an outer front view of one type of safety device according to the invention, Fig. 2 is an inside view of the said device.

Figure 3:
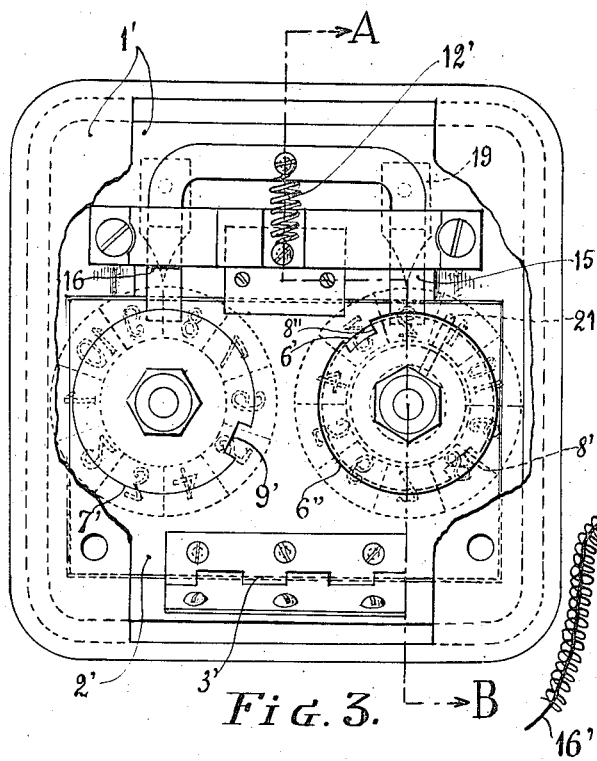
Figure 4:
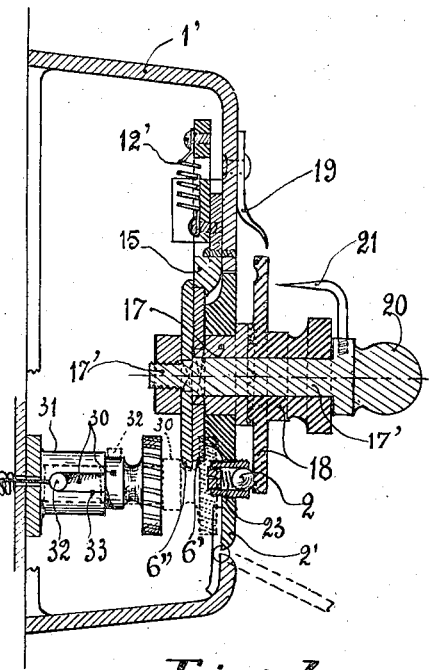
Figure 5:
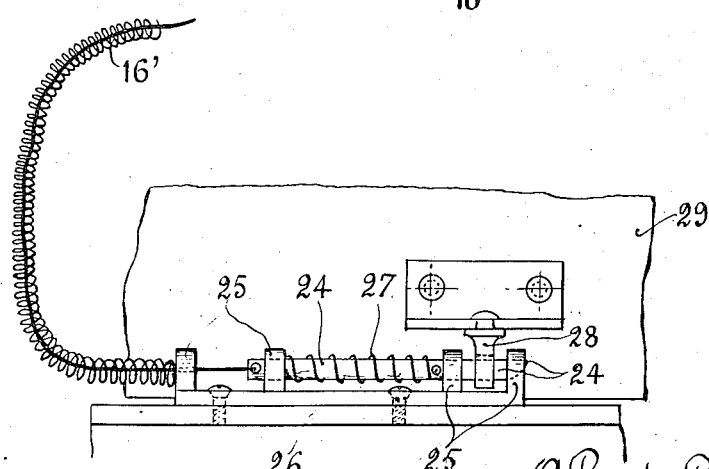

Fig. 3 is an outer view of a safety device according to the invention, provided with a modified construction of secret lock, Fig. 4 is a transverse section through the latter device, taken on the line A—B of Fig. 3, and showing the device for operating at a distance the sliding bolt which keeps the bonnet locked from the inside, and Fig. 5 is an elevation of the said sliding bolt and surrounding parts.

Referring to Figs. 1 and 2, the device comprises a metal box or casing 1 of suitable depth to enable the operating lever or the like of the switch of the sparking-circuit to be enclosed therein. The said casing 1 is closed by means of a lid or door 2 hinged at 3 and adapted to be locked by means of inner locking fingers 4 and 5 slidably mounted on the inner face of the door 2 and which, under the influence of a spring 12, normally engage rotatable inner discs 6 and 7 secured on shanks which extend through and are rotatably supported by the corresponding wall of the casing 1; notches 8 and 9 cut in the periphery of the discs 6 and 7 render the latter entirely free from engagement by the fingers 4 and 5 and enable them to clear the latter when the said inner discs are, by suitable rotation, caused to take a position wherein their notches 8 and 9 register with the fingers 4 and 5 respectively. The door 2 can thus be opened by placing the inner discs 6 and 7 in a suitable position. Outer discs 10 and 11 having their circumference graduated and provided with figures, are mounted on the outer ends of the shanks of the inner discs 6 and 7. It will therefore be sufficient for an authorized person to be acquainted with the figures of the outer discs which correspond to a given fixed point when the notches of the inner discs register with their locking fingers to enable such person to open the door 2 by rotating the discs 10 and 11 until the required figures register with the said fixed point. The outer discs are mounted on shanks of square or regular polygonal section from which they can be removed in order to replace them in a different position so as to change the figures which correspond to the notches and thus to obtain a new secret combination. The door 2 possesses notches allowing the said door to be closed clear of the outer discs, such notches being made in such a way as to exclude any possibility of observation of the inner discs when the door is closed. No key is required to open the said door, or to close same, as it is sufficient for this purpose to place the discs, in a suitable position. It will be sufficient to rotate the outer discs indifferently after having closed the door 2 to make it impossible for any non-authorized person to open the said door. The peripherical edges of the inner discs 6 and 7 are rounded and the ends of the fingers 4 and 5 are bevelled to enable these fingers to be easily pushed back by the discs 6 and 7 before engaging the said discs when the door is being closed. The fixation of the apparatus to the dashboard of the motor-car is effected in such a manner that the removal is only possible after having first opened the door 2. In the example illustrated, this result is reached by fixing the bottom of the casing (which has a suitable portion cut-out thereof according to the size of the switch and the other organs to be contained within the said casing) is secured to the dashboard of the motor-car by means of four screws 14 situated at the corners, and which can only be reached from the inside of the casing.

The latter remaining normally closed, the removal of the apparatus is impossible or at least very long and difficult.

In the embodiment illustrated by Figs. 3 and 4, the shanks of the discs are rotatably mounted through and supported by the door 2', while the locking fingers 15 and 16 are slidably mounted against the inner face of the front-wall proper of the apparatus and, under the influence of the spring 12', normally tend to engage themselves between the inner face of the door 2' and the corresponding discs. In order to multiply the secret combination of the rock, one of the inner discs of the example illustrated by Figs. 1 and 2 is in the present embodiment replaced by two superposed inner discs 6' and 6" mounted on two independent but coaxial shanks (one being hollow) 17 and 17' respectively. The shank 17 is fitted with a graduated outer disc 18 provided with figures, a stationary index or pointer 19 provided for the purpose of enabling the person acquainted with the secret combination to place the aforesaid disc 18 in the position wherein the notch 8' of the disc 6' registers with the finger 15. Similarly, the outer end of the shank 17' is fitted with an operating knob 20 provided with a pointer 21 enabling the person acquainted with the secret combination, by reference of its position to the figures provided on the disc 18, to place the inner disc 6' also in the position wherein its notch 8" registers with the locking finger 15. After having, by rotation of the outer disc 11', caused the notch 9' of the inner disc 7' (corresponding to the second inner disc 7 of the example illustrated by Figs. 1 and 2) to register with the finger 16, it is necessary that the notches 8' and 8" of the discs 6' and 6" should, by rotation of the disc 18 and of the knob 20 respectively, be both caused to register at the same time with the locking finger 15, before the door 2' can be opened. It it obvious that the disc 6' might also be replaced by the superposed inner discs similar to the discs 6 and 6'. In the example illustrated by Figs. 3 and 4, an index or pointer 19 is provided for each of the outer discs 11' and 18', and, just the same as in the example illustrated by Figs. 1 and 2, the outer discs are secured on their respective shanks in such a manner as to make possible the alteration of the figures which, by their position in relation to the corresponding fixed point, indicate to the authorized person operating the device the registration of the notches of the inner discs with their respective locking fingers. In order to prevent the outer discs from rotating too freely, and to enable the operator to obtain more readily the setting in the required position, metal balls 22 under the influence of springs 23 located within suitable hollow screws or the like bear against the faces of the outer discs 11' and 18, which are for this purpose provided with suitable recesses or radial grooves. A similar arrangement may be adopted for the operating knob 20 fitted on the shank 17' of the inner disc 6".

Referring to Figs. 4 and 5, one of the flaps of the bonnet of the motor-car being kept permanently locked from the inside by means of any suitable known device, the other flap is also normally locked from the inside by means of a sliding bolt more particularly illustrated by Fig. 5. This bolt 24 is maintained and guided in suitable lugs 25 strongly secured to the frame 26 of the car and, under the influence of a spring 27, it engages normally an eye 28 secured to the inner wall of the corresponding flap 29 of the bonnet. The bolt 24 can however, be disengaged by means of a suitable cable connection 16', for instance of the Bowden type, leading to the interior of the casing 1' of the apparatus, wherein it is secured to a key 30 able to slide within a tube 31 provided with lateral slots 3. The key 30 is provided with projections 32 adapted to slide within the slots 33. By pulling the key 30 and rotating same to the extent of about 90°, it will remain in the position indicated in dotted lines on Fig. 4 owing to the engagement of the projections 32 with the edge of the tube 31, while the sliding bolt 24 will have been disengaged owing to the traction exerted on the cable 16', so that the bonnet can be opened.

When the vehicle is at a standstill, to prevent the theft thereof, it will be sufficient to interrupt the sparking circuit by means of the switch located inside the casing of the safety device, and to lock the door of the said casing. Indeed, the device not only protects the switch of the sparking circuit, but it moreover prevents tampering with the conductors or establishing the contact directly at the magneto inside the bonnet of the car, as the said bonnet is kept locked by the bolt 24 which can only be disengaged by means of the key 30 situated within the casing of the apparatus.

It is to be understood that, besides the organ for operating the bolt which maintains the bonnet of the car locked, the casing of the apparatus may if desired contain an automatic switch, taking the place of the ordinary switch of the sparking circuit referred to above, and combined with the locking device in such a manner that the sparking circuit is normally interrupted as long as the door of the casing is kept locked, but is automatically reestablished as soon as the inner discs have been placed in the position wherein the aforesaid door is unlocked, without it being necessary actually to open such door.

The provision of such an automatic switch does not, however, itself form a part of the invention, which essentially relates to the device proper for the protection of the switch against unauthorized tampering.

It is also to be understood that the invention is not limited to the embodiments described above and illustrated by the drawings, and that various alterations of details and structural modifications may be made. Further secret locking devices according to the invention may be employed for various other purposes besides the prevention of motor-car thefts.

We claim:

1. In a safety device against motor-car thefts, the combination of: a stationary member constituted by a casing adapted to be secured to the dash board of the car and to enclose a suitable switch for the sparking circuit; a hinged member constituted by a door adapted to open outwardly; inner discs secured on shanks pivotally carried by one of the said members, spring-controlled locking fingers slidably mounted against the inner wall of the other of said members and adapted normally to engage each one of the inner discs in such a manner as to prevent the opening of the aforesaid door; a notch cut in the periphery of the aforesaid inner discs and adapted to render the latter free of engagement by the corresponding fingers when caused to register with the latter; circumferentially graduated outer discs secured on the shanks of the inner discs; stationary indexes or pointers enabling an operator acquainted with the secret combination required to open the door to set the said outer discs in the position wherein the notches of the corresponding inner discs register with their respective fingers; means for altering the position of the outer discs on their shank in relation to the corresponding inner discs; and means exerting a resilient pressure on the aforesaid outer discs and adapted to cooperate with notches or radial grooves in the latter to prevent them from rotating too freely; all substantially as described.

2. In a safety device according to claim 1, the addition for each or one of the inner discs of a superposed second inner disc secured on an independent shank coaxial in relation to that of the first disc, a notch cut in the periphery of such second inner disc and adapted when caused to register therewith to clear the corresponding locking finger which keeps such second inner disc locked after the first inner disc has become disengaged by such finger by causing the notch of such first inner disc to register therewith in the first instance, an operating knob secured on the outer end of the aforesaid independent shank of the superposed second inner disc, and a pointer secured to said knob and adapted to indicate, by reference to the graduations on the outer disc corresponding to the aforesaid first inner disc, to the operator acquainted with the secret combination for unlocking the device, the position of the aforesaid operating knob wherein the notch of the corresponding inner disc registers with that of the inner disc corresponding to the said graduated outer disc, all substantially as described.

3. The combination with a safety device according to claim 1 of a device for locking the bonnet of the motor-car from the inside comprising a sliding bolt maintained and guided in lugs secured to the frame of the motor car, a stationary member secured to the inner wall of the bonnet of the said car and adapted to be normally engaged by the sliding bolt under the influence of a spring acting on the latter and hand operated means located within the casing of the apparatus for disengaging the said bolt through the medium of a suitable cable connection, substantially as described.

In testimony whereof we signed hereunto our names in the presence of two subscribing witnesses.

ALFRED LAURITZEN.
VICTOR LAURITZEN.

Witnesses:
G. Y. ZABAUL,
EMIL VANDENSIEH.